US012624457B2

(12) United States Patent
Lee et al.

(10) Patent No.: US 12,624,457 B2
(45) Date of Patent: May 12, 2026

(54) THERMAL DECOMPOSITION METALLIZATION PROCESS

(71) Applicant: GLENAIR, INC., Glendale, CA (US)

(72) Inventors: Jar-Wha Lee, Columbus, OH (US); Zachary Douglas Adams, Columbus, OH (US); Mark Andrew Maltese, Columbus, OH (US)

(73) Assignee: GLENAIR, INC., Glendale, CA (US)

( * ) Notice: Subject to any disclaimer, the term of this patent is extended or adjusted under 35 U.S.C. 154(b) by 0 days.

(21) Appl. No.: 16/697,731

(22) Filed: Nov. 27, 2019

(65) Prior Publication Data

US 2020/0165729 A1 May 28, 2020

Related U.S. Application Data

(60) Provisional application No. 62/771,814, filed on Nov. 27, 2018.

(51) Int. Cl.
*C23C 18/08* (2006.01)
*B05D 3/10* (2006.01)
*C23C 18/04* (2006.01)

(52) U.S. Cl.
CPC .............. *C23C 18/08* (2013.01); *B05D 3/101* (2013.01); *C23C 18/04* (2013.01); *B05D 2201/02* (2013.01); *B05D 2350/65* (2013.01); *B05D 2401/10* (2013.01)

(58) Field of Classification Search
CPC ........................................................ C23C 18/08
See application file for complete search history.

(56) References Cited

U.S. PATENT DOCUMENTS

| | | | | |
|---|---|---|---|---|
| 6,228,922 | B1 * | 5/2001 | Wang | C08K 3/08 524/413 |
| 2006/0289189 | A1 * | 12/2006 | Aisenbrey | B29C 48/34 174/36 |
| 2008/0187648 | A1 * | 8/2008 | Hart | B01J 23/745 427/8 |
| 2011/0031001 | A1 * | 2/2011 | Ishikawa | H05K 1/097 174/257 |
| 2013/0192423 | A1 * | 8/2013 | Yang | B22F 9/24 75/370 |
| 2019/0254555 | A1 * | 8/2019 | Bouchard | G01K 7/16 |
| 2019/0390037 | A1 * | 12/2019 | Kinlen | C09D 7/70 |

* cited by examiner

*Primary Examiner* — Robert A Vetere
(74) *Attorney, Agent, or Firm* — Porter Wright Morris & Arthur LLP

(57) ABSTRACT

A method for forming a conductive metal-polymer composite coated polymer includes providing a polymer substrate and immersing the polymer substrate in a metal solution. The method further includes decomposing the metal solution in a thermally controlled environment and reducing the metal solution to metal such that the metal is deposited on a surface of the polymer substrate. After reducing the metal solution, the method includes treating the surface with a polymer coating to form the metal-polymer composite coated polymer.

16 Claims, 3 Drawing Sheets

THERMAL DECOMPOSITION METALLIZATION PROCESS

CROSS-REFERENCE TO RELATED APPLICATIONS

This application claims the priority benefit of U.S. Provisional Patent App. No. 62/771,814 filed Nov. 27, 2018, which is incorporated herein by reference in its entirety.

TECHNICAL FIELD

The present disclosure relates generally to a thermal decomposition metallization process and conductive metal-polymer composite coated polymer substrates prepared by the provided processes.

BACKGROUND

Electrically conductive metal-coated polymer fibers have been proposed as a solution to the need in the art for improved conductive materials. However, there remains unmet needs in the art for improved methods of preparing metal-coated fibers.

SUMMARY

According to one embodiment, a method for forming a conductive metal-polymer composite coated polymer includes providing a polymer substrate and immersing the polymer substrate in a metal solution. The method further includes decomposing the metal solution in a thermally controlled environment and reducing the metal solution to metal such that the metal is deposited on a surface of the polymer substrate. After reducing the metal solution, the method includes treating the surface with a polymer coating to form the metal-polymer composite coated polymer.

BRIEF DESCRIPTION OF THE DRAWINGS

The present disclosure will be more readily understood from a detailed description of some example embodiments taken in conjunction with the following figures.

DETAILED DESCRIPTION

Figure 1:
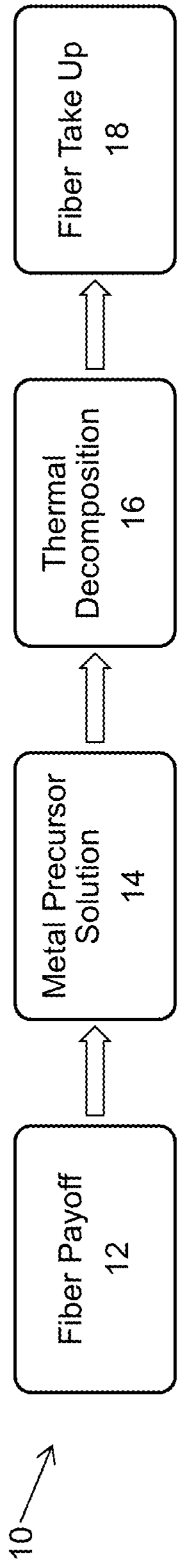
FIG. 1 is a flowchart for a method for forming a conductive metal-polymer composite coated polymer according to an embodiment.

In one embodiment, a method is provided for fabricating metal-coated polymer surfaces having high electrical conductivity. The polymer surfaces may include, but not be limited to, surfaces of a polymer fiber(s) or a polymer sheet(s). In some embodiments, a method comprises decomposing a metal based solution or solutions on the surface of a polymer fiber(s) or sheet(s) utilizing an in-situ thermal reduction of metal salts and coating a final functional polymer onto the polymer fiber(s) or sheet(s) to entrap the continuous, conductive metal network and create a quasi-bilayer polymer/metal composite coating that adheres to the designated fiber or sheet. In some embodiments, one or more of the steps set forth above may be repeated one or more times.

In some embodiments, a method for forming a highly conductive metal-polymer composite coated polymer is provided comprising: providing a polymer substrate such as, for example, a polymer fiber or polymer sheet; immersing the polymer in a metal based solution; decomposing the metal solution in a thermally controlled environment; reducing the metal solution to metal such that conductive metal is deposited on the surface of the polymer; and subsequently treating the surface with a conformal polymer coating. Depending on the porosity of the selected substrate, the deposited metal may also be present on surfaces throughout the fiber matrix of the substrate. Adhesion and entrapment of metal to the polymer substrate depends on variety of factors, including but not limited to: interaction of polymer functional groups with solution substituents, concentration of additives in the metal solution, post-treatment functional coating, and method of thermal decomposition. In addition, depending upon which polymer substrate is chosen, a pretreatment surface modification step may be used in order to enhance susceptibility of the substrate to subsequent coatings.

A variety of polymer substrates can be metallized using the thermal decomposition metallization process. Ideally the substrate has a permeable, open porous structure and high heat resistance. Substrates with high elongation and low glass transition/melting temperatures are less ideal, as expansion and contraction of the substrate can negatively impact conductive contact following metallization. High moisture regain typically serves as an indicator for a porous polymer substrate. Greater substrate surface area also allows for more adsorption of the metal solution and, in turn, more conductive polymers. Most non-cellulose-based substrates require surface modification prior to metallization, as they are non-porous and would otherwise have poor retention of metal solution, resulting in decreased adhesion characteristics upon reduction to metal. Potential substrates include cellulose-based polymers, such as viscose rayon, extra-long staple (ELS) Supima® cotton, Tencel® lyocell, mercerized cotton, Lenzing Modal®, as well as synthetically derived polymers such as porous polytetrafluoroethylene (PTFE), expanded polytetrafluoroethylene (ePTFE), polyetheretherketone (PEEK), nylon 6, liquid crystal polymer (LCP), nylon 6,6, polyimide, para-aramid, and meta-aramid. Preferably, the substrate comprises mercerized cotton. In some embodiments where adhesion of the metallic layer to the substrate is not desired, potential substrates include any material able to withstand the heat treatment and thermal decomposition steps shown and described herein.

In some embodiments, the metal solution may comprise organic or inorganic salts of metals such as, for example, copper, silver, aluminum, gold, iron, nickel, or combinations thereof. In some embodiments, the metal solution may be selected from the group consisting of organic or inorganic salts of copper, silver, aluminum, gold, iron, nickel, and combinations thereof. In some embodiments, the metal precursor solution comprises an organic solvent based organometallic silver compound.

In some embodiments, the solvent may comprise xylene, acetone, toluene, benzene, n-methyl pyrrolidone, ethanol, water, commercially available and environmentally friendly alternatives, or combinations thereof. In some embodiments, the solvent may be selected from the group of solvents consisting of xylene, acetone, toluene, benzene, n-methyl pyrrolidone, ethanol, water, commercially available and environmentally friendly alternatives, and combinations thereof. In some embodiments, the solvent is an organic solvent. In some embodiments, the solvent is toluene.

In some embodiments, the organometallic silver compound may include, but is not limited to, silver acetate, silver octanoate, silver nonanoate, silver neodecanoate, silver undecanoate, silver dodecanoate, silver nitrate, diamminesilver(I), silver(I) hexafluoropentanedionate-cyclooctadiene, silver 2-ethylhexylcarbamate, silver phenolate, or combinations thereof. In some embodiments, the organometallic silver compound may be selected from the group consisting of silver acetate, silver octanoate, silver nonanoate, silver neodecanoate, silver undecanoate, silver dodecanoate, silver nitrate, diamminesilver(I), silver(I) hexafluoropentanedionate-cyclooctadiene, silver 2-ethylhexylcarbamate, silver phenolate, and combinations thereof.

In some embodiments, the additive in the metal solution may include, but is not limited to, ethyl cellulose, graphene nano-platelets, polystyrene-block-poly(ethylene-ran-butylene)-block-polystyrene-graft maleic anhydride, poly(ethylene-co-ethyl acrylate), ethylene-acrylic acid, hexadecyltrimethoxysilane, triethoxy(vinyl)silane, metallic nanoparticles, or combinations thereof. In some embodiments, the additive in the metal solution may be selected from the group consisting of ethyl cellulose, graphene nano-platelets, polystyrene-block-poly(ethylene-ran-butylene)-block-polystyrene-graft maleic anhydride, poly(ethylene-co-ethyl acrylate), ethylene-acrylic acid, hexadecyltrimethoxysilane, triethoxy(vinyl)silane, metallic nanoparticles, and combinations thereof. Not to be limited by theory, it should be noted that while the metallic solution may contain nanoparticles, these are solely utilized as a binder or adhesion promoter and are not the main conductive component in the solution formulation. Upon forming the conductive coating, addition of nanoparticles may have little to no effect on the overall conductivity of the as processed fiber or film.

In some embodiments, the functional coating may include, but is not limited to, ethyl cellulose, graphene nano-platelets, polystyrene-block-poly(ethylene-ran-butylene)-block-polystyrene-graft maleic anhydride, poly(ethylene-co-ethyl acrylate), ethylene-acrylic acid, hexadecyltrimethoxysilane, triethoxy(vinyl)silane, low density polyethylene, polyethylene terephthalate, poly(vinyl butryal-co-vinyl alcohol-co-vinyl acetate), poly vinyl butyral, polystyrene-block-polybutadiene-block-polystyrene, various solvent or oil-based polyurethanes, MTO Sterling Tarnish Inhibitor offered by MacDermid, or combinations thereof. In some embodiments, the functional coating may be selected from a group consisting of ethyl cellulose, graphene nano-platelets, polystyrene-block-poly(ethylene-ran-butylene)-block-polystyrene-graft maleic anhydride, poly(ethylene-co-ethyl acrylate), ethylene-acrylic acid, hexadecyltrimethoxysilane, triethoxy(vinyl)silane, low density polyethylene, polyethylene terephthalate, poly(vinyl butryal-co-vinyl alcohol-co-vinyl acetate), poly vinyl butyral, polystyrene-block-polybutadiene-block-polystyrene, various solvent or oil-based polyurethanes, MTO Sterling Tarnish Inhibitor offered by MacDermid, and combinations thereof. In some embodiments, the functional coating comprises polystyrene-block-poly(ethylene-ran-butylene)-block-polystyrene-graft maleic anhydride. In some embodiments, the addition of a functional coating typically enhances durability and washability of the coated substrate, as it serves as a water-resistant barrier. In some embodiments, the functional coating does not interfere with conductive metal contact and also serves as a binding matrix that does not disrupt overall flexibility or functionality of the substrate.

In some embodiments, the pretreatment surface modification solution, which may vary depending on the selected substrate, includes, but not limited to: sulfuric acid ($H_2SO_4$), hydrochloric acid (HCl), hydrofluoric acid (HF), nitric acid ($HNO_3$), phosphoric acid ($H_3PO_4$), perchloric acid ($HClO_4$), lithium hydroxide (LiOH), sodium hydroxide (NaOH), potassium hydroxide (KOH), rubidium hydroxide (RbOH), cesium hydroxide (CsOH), calcium hydroxide ($Ca(OH)_2$), or combinations thereof. In some embodiments, the pretreatment surface modification solution, which may vary depending on the selected substrate, may be selected from a group consisting of, but not limited to: sulfuric acid ($H_2SO_4$), hydrochloric acid (HCl), hydrofluoric acid (HF), nitric acid ($HNO_3$), phosphoric acid ($H_3PO_4$), perchloric acid ($HClO_4$), lithium hydroxide (LiOH), sodium hydroxide (NaOH), potassium hydroxide (KOH), rubidium hydroxide (RbOH), cesium hydroxide (CsOH), calcium hydroxide ($Ca(OH)_2$), and combinations thereof.

The thermal decomposition step can vary between substrates and may be accomplished using conductive, convective, or radiative heating over a temperature range of about 25 to about 300° C. or 90 to 300° C. based upon the thermal decomposition temperatures of the metallic solution and the substrate. In some embodiments, the decomposition and formation of metal from the metallic solution can be accomplished in a roll-to-roll fashion using a tube furnace, series of parallel (vertical or horizontal) heating panels, infrared heating, laser sintering or combinations thereof. In other embodiments, an oven may be used in a batch processing method.

In one or more of the embodiments herein, the thermal decomposition step may include a modified Tollens' process. Specifically, a solution comprising an organometallic silver compound may be titrated with a reducing agent in the presence of the fiber substrate. For example, a silver organometallic salt in aqueous ammonium hydroxide solution may be titrated with a reducing agent, such as formic acid, glucose, inverted sugar, Rochelle salt, hydrazine sulfate, etc. The reacted product results in silver precipitation on the fiber substrate at room temperature. Various modifications are possible in light of the above teachings. Some of those modifications have been discussed, and others will be understood by those skilled in the art.

In one or more of the embodiments herein, the conductivity of the polymer fiber(s) or sheet(s) may be further increased by utilizing additional passes through the metal solution, followed by thermal decomposition. In some embodiments, an additional pass of the polymer fiber(s) or sheet(s) results in more consistent coverage of the metal coating and, in turn, more consistent conductivity. In some embodiments, a second pass of the polymer fiber(s) or sheet(s) through the metal solution and heating source may allow for voids in the metallic coating to achieve unity while also ensuring a more complete, if not fully complete, decomposition of the first coating. In such embodiments, the doubly coated polymer has a room temperature resistance value of 2 to 100 Ω/ft.

In one or more embodiments set forth herein, the resulting metal-coated polymers (e.g., polymer fiber(s) or polymer sheet(s)) exhibit high electrical conductivity, good thermal stability, mechanical flexibility, durability, and/or substantial washability, and/or may be lightweight. The relative ease of metallizing polymer fibers and/or sheets via this method makes it suitable as a finishing coating or as an alternative strike layer for subsequent electrolytic plating. The polymers (e.g., polymer fiber(s) and/or polymer sheet(s)) may be used in applications such as signal and power transfer and EMI shielding as well as conformal antennas and microelectronics applications in E-textiles. The one or more methods shown and described herein may also be used to create flexible, light-weight, and conductive films or papers which find uses in cable shielding for attenuation at a multitude of electromagnetic spectrums. Furthermore, may be used to form antimicrobial stitching or garments for medical applications, such as in treatment of burn victims. The one or more products formed by the one or more methods shown and described herein may also be chopped or milled for utilization as a conductive filler in composite applications.

Referring to FIG. 1, one embodiment of a method for thermal decomposition metallization is shown as 10. In this embodiment, method 10 includes a reel of substrate such as, for example a reel of polymer fiber or sheet. In step 12, the substrate is unwound from the reel and fed to and immersed in a metal precursor solution or bath 14. The substrate is then removed from the metal precursor solution or bath and fed to a thermal decomposition step 16. After decomposing the metal precursors onto the substrate in step 16, the substrate is fed to a second reel for substrate take up 18.

In such a method, a polymer surface of the substrate such as a fiber or sheet is coated to form a continuous or substantially continuous metallic network which results in high electrical conductivity of the substrate. In one or more of the embodiments shown and described herein, a thin coating of metal can be obtained on a multitude of complex shapes, with coverage of the metal coating being uniform or substantially uniform and/or enhanced due to a substrate selection. In the one or more embodiments wherein a porous substrate is used, the metal may also be incorporated into the polymer matrix to form a composite structure. In some of these illustrative treated substrates, the resulting substrate is light-weight and contains a low mass fraction of metal but has an excellent metallic conductivity.

In some embodiments, a subsequent polymer coating may be deposited onto the metal coating which may result in a quasi-bilayer composite coating on the polymer substrate that allows for conductive contact and enhanced durability. In some embodiments, the thermally decomposed metallic coating exhibits unusually good adhesion to polyetheretherketone (PEEK). Not to be limited by theory, this good adhesion is believed to be due to an alkane interaction with the PEEK surface during processing above the glass transition temperature. In some embodiments, cellulose-based fibers are used as the polymer substrate to be metalized via the organometallic solution and decomposition steps due to their unique ability to adsorb the organometallic solution, high thermal resistance, and their capability to quickly and evenly distribute heat during decomposition. Their individual filaments are unusually well defined and less susceptible to fusing than other multifilament polymers. In some embodiments, the substrate can be any polymer substrate that has a high adsorption of the organometallic solution, thermal resistance, and distribution rate.

In some embodiments, the polymer substrate is immersed into a metal solution containing the metal precursors for a residence time from about 2 to about 120 seconds or from about 2 to about 15 seconds. No bath agitation is required for metal solution penetration into substrates such as, for example, staple/multifilament matrices. However, in some embodiments, having the substrate run through a portion or the entire process in low tension makes the substrate more susceptible to metal solution penetration. Not to be limited by theory, organometallic salt buildup on the processing rollers, following immersion of the polymer substrate in the metal solution, assists with the maximization of metallic solution take up, resulting in more uniformity in the metallic coating and better conductivity of the polymer substrate. Additionally, in some embodiments, a periodic dosing of solvent onto the salt buildup may be applied which may allow for a consistent surface concentration of the organometallic salt on the as processed polymer substrate surface (e.g., fiber or sheet). Not to be limited by theory, it is believed that this results in less variance in the final coating thickness, uniformity, and conductivity of the fiber after subsequent processing.

In some embodiments, after the polymer substrate is removed from the metal solution, the polymer substrate coated with the metal solution is moved into thermal decomposition step, wherein the metal precursors on the polymer substrate are then reduced to a conductive metal by one or more of the thermal decomposition methods shown and described herein. In some embodiments, in order to have consistent decomposition of the organometallic solution, conductive contact between the heating element and the coated substrate is maintained. Illustrative metal precursors for use in the metal solution include organic or inorganic salts of copper, silver, aluminum, gold, iron, nickel, and combinations thereof. The metal solution is not required to consist of metal nanoparticles. However, the metal solution can include nanoparticles if desired. In some embodiments, the method may include, after decomposing the metal precursors onto the substrate, coating a final elastomeric polymer onto the metal coating, resulting in a metal/polymer composite.

Illustrative polymer substrates may include, but not be limited to, fibers, paper, tissue, nonwovens, wovens, filters, or film. In some embodiments, illustrative polymers substrates may include, but not be limited to, polymer substrates that may properly absorb/adsorb the metal solution. In some embodiments, proper absorption/adsorption may be achieved using a suitable etching process or, in some embodiments, a substrate with a degree of porosity. Illustrative polymer substrates that may be used herein, may include, but not be limited to, cellulose-based polymers, such as viscose rayon, ELS cotton (such as, for example, offered by Supima®), Tencel® (offered by Lenzing), mercerized cotton (offered by Coats and Clark), Modal® (offered by Lenzing), as well as synthetically derived polymers such as porous polytetrafluoroethylene (PTFE), expanded polytetrafluoroethylene (ePTFE), polyetheretherketone (PEEK) (such as, for example, offered by Zeus) nylon 6 (such as, for example, offered by Swicofil), nylon 6,6 (such as, for example, offered by Swicofil), liquid crystal polyester (such as, for example, offered under trade name Vectran® from Kuraray), polyimide (such as, for example, offered under the trade name Kapton® Polyimide films from DuPont de Nemours, Inc.), para-aramid (such as, for example, offered under trade name Twaron® from Teijin Ltd.), meta-aramid (such as, for example, offered under trade name Nomex® from Dupont), or combinations thereof. In some embodiments, the substrate comprises mercerized cotton. Not to be limited by theory, it is believed that mercerized cotton works well in the thermal decomposition metallization process because it has an increased moisture absorption and tensile strength.

Figure 2:
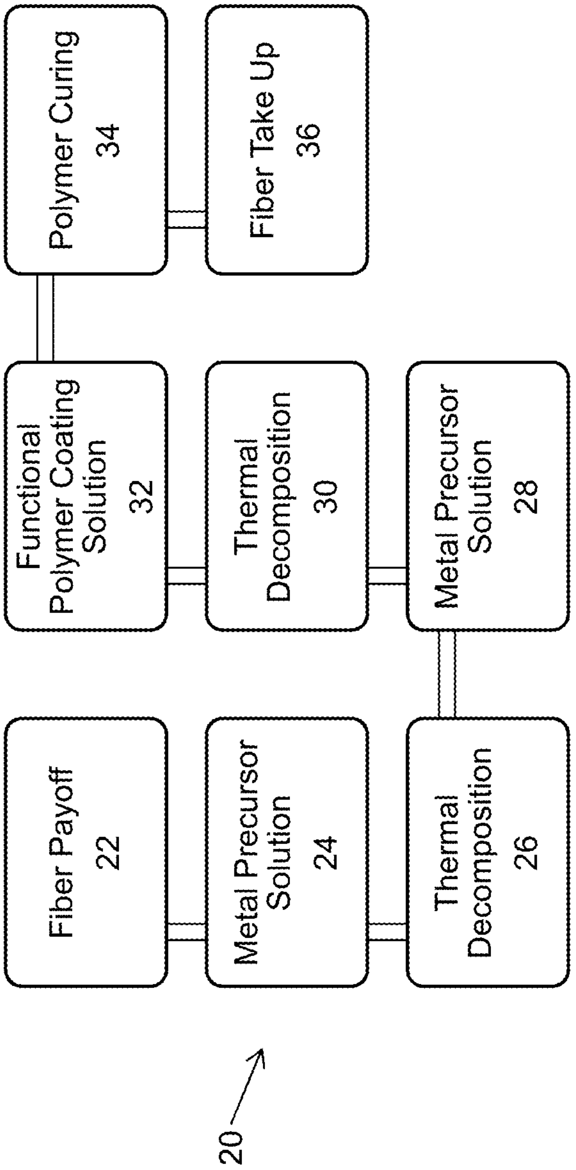
FIG. 2 is a flowchart for a method for forming a conductive metal-polymer composite coated polymer according to an embodiment.

One example of a thermal decomposition metallization method is shown in FIG. 2 as method 20. The method 20 includes unwinding a mercerized cotton fiber from a reel (e.g., fiber payoff) in step 22. The method 20 also includes feeding and/or immersing the mercerized cotton fiber into a silver organometallic solution at step 24. Interaction between the silver organometallic compound and the cellulose linkages provides infiltration and adhesion of the organometallic compound to the substrate. This bonding yields a metallized cotton matrix upon heat treatment and thermal decomposition through a tube furnace. After leaving the silver organometallic solution 24, the method 20 incudes feeding and/or moving the mercerized cotton fiber into a tube furnace for heat treating and/or thermal decomposing the metallic precursors onto the fiber at step 26. In some embodiments, the method 20 may include repeated metal solution coatings/immersions steps and subsequent heat treatments steps, which may increase uniformity of the coating and conductivity of the coated substrate. For example, method 20 may include feeding and/or immersing the fiber into a second metal solution or bath at step 28. This metal solution can be the same metal solution as the first metal solution in step 24 or a different metal solution. The method 20 may also include feeding and/or moving the fiber from the second metal solution 28 into a second heat treating and/or thermal decomposing step 30 such as, for example, into a second tube furnace.

Figure 3:
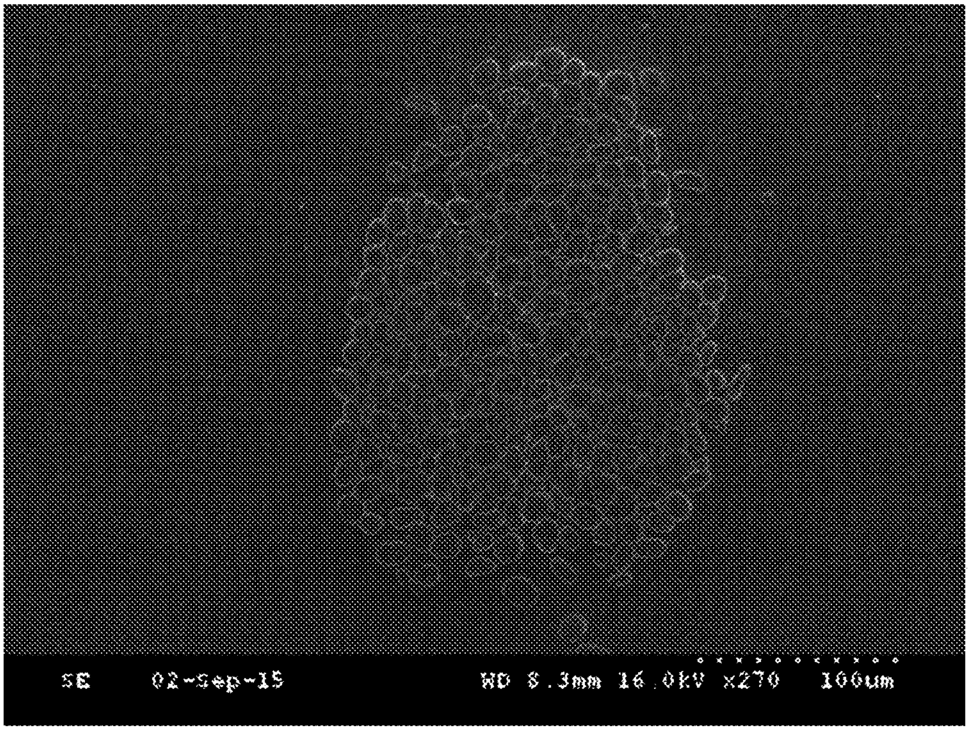
FIG. 3 is a cross-section of a metal-coated polymer fiber bundle made according to an embodiment at 270× magnification.
Figure 4:
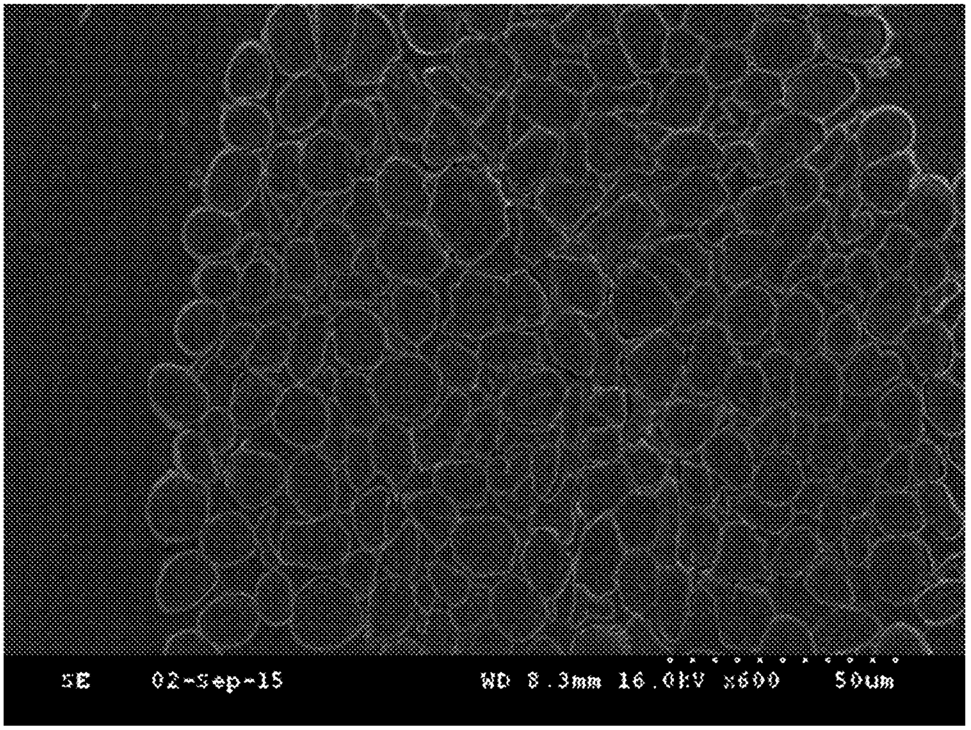
FIG. 4 is a cross-section of a metal-coated polymer fiber bundle made according to an embodiment at 600× magnification.
Figures 5A, 5B, 5C, 5D:
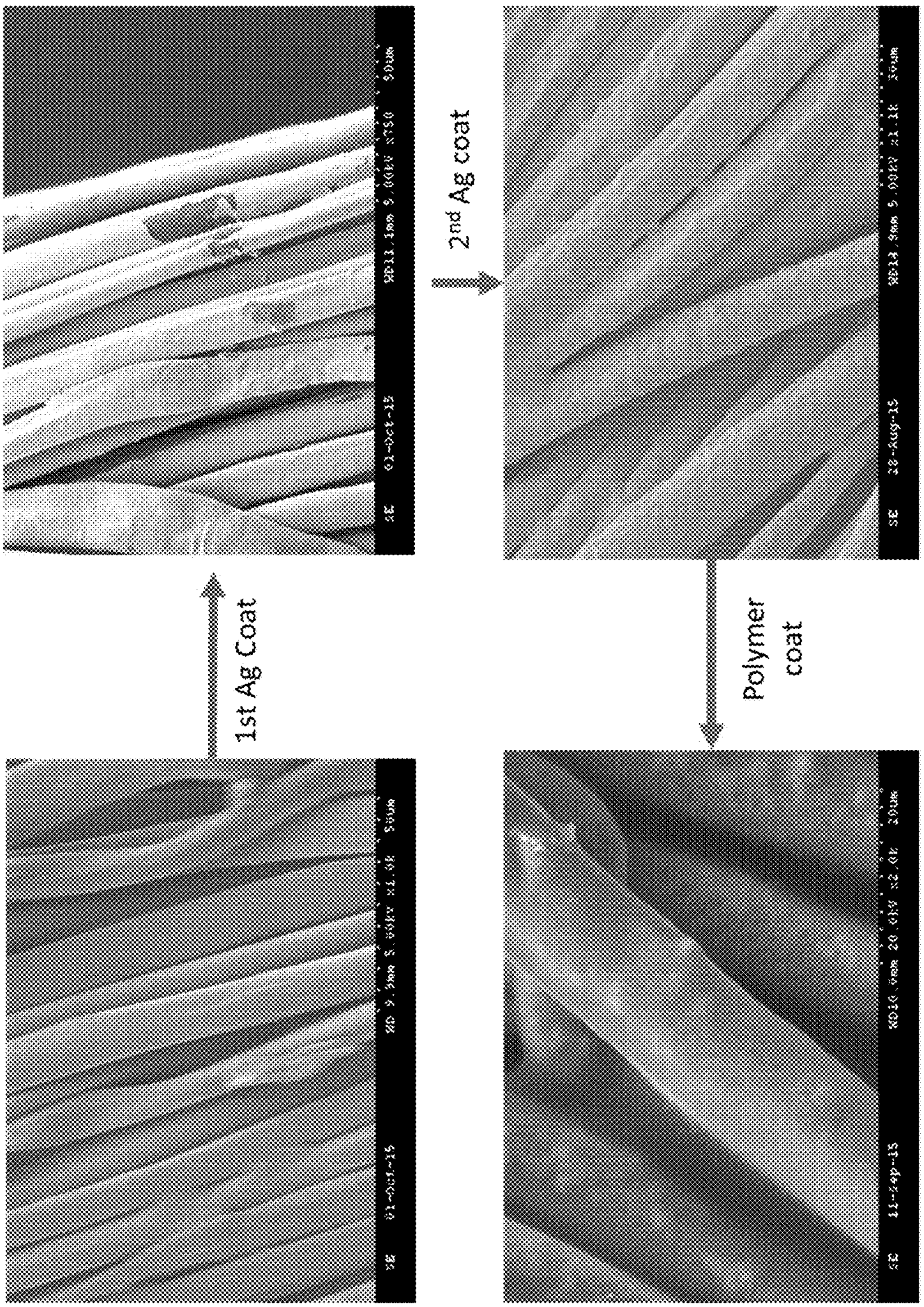
FIGS. 5A-5D are surface morphology SEM images from raw mercerized cotton fiber made according to an embodiment.

Following the metallization steps 24, 26, 28 and 30 (i.e., immersing the substrate into the metal solution and then decomposing the metal precursors onto the substrate), the method 20 may include coating a functional polymer coating onto the metallized fiber at step 32 such as, for example, a maleic anhydride grafted polymer. The method 20 may also include moving and/or feeding the fiber from the functional polymer coating step 32 to and polymer curing step 34. The polymer curing step may include a variety of curing methods, including but not limited to, the heat treatment and thermal decomposition steps shown and described herein. FIGS. 3 and 4 are cross-sections of a metal-coated polymer fiber bundle made according to an embodiment at 270× and 600× magnification, respectively. FIGS. 5A-5D are surface morphology SEM images from raw mercerized cotton fiber subjected to a method according to an embodiment.

In this example, the function polymer may be coated onto the fiber at a thickness from about 100 nm to about 1 μm, onto the metal coating layer to assist in the adhesion of the metallic coating to the fiber and to seal susceptible pores that can cause degradation of the metal coating upon washing. In some embodiments, the thickness and morphology of the coating should not completely insulate the substrate and should allow for retention of surface conductivity. In some embodiments, the resulting quasi-bilayer composite coating may withstand soldering and allow for conductive connections to be made between coated substrates. In some embodiments, the amount and distribution of silver in the fiber may be adjusted by varying the duration and conditions of the infiltration/immersion and thermal reduction processes, such as the concentration of metal in the metal solution, the concentration of binders in the solution, temperature and gradient of heating during decomposition, and number of coatings. The methods shown and described herein may include multiple coating steps and subsequent decomposition steps as desired. In some embodiments, the final metal coating thickness on the substrate may range from about 0.5 to about 1.0 Once an initial metallic layer is thermally decomposed, subsequent organometallic coatings, in some embodiments, may be decomposed to metal using electrical or thermal heating methods.

The conductivity of the fiber can be adjusted over a wide range depending upon the aforementioned factors. With the one or more methods set forth above herein, even papers, semi-permeable films, and surface modified films may be made conductive using the same or similar process methodologies.

In order that the invention may be more readily understood, reference is made to the following examples, which are intended to be illustrative of embodiments of the invention, but are not intended to be limiting in scope.

Example 1

A 50/1 ELS Supima® cotton fiber (300D) was processed in a roll-to-roll setup containing a silver organometallic solution coating stage and a tube furnace thermal decomposition. The silver solution comprised from about 15 to about 20 wt % Ag derived from a silver carboxylate salt containing between 8 to 12 carbon atoms dissolved in toluene. Running at a line speed of 2.7 ft/min, residence time in the metallic solution was approximately 5 seconds followed by 45 seconds of conductive heat treatment in the furnace. The furnace comprised of three heating zones, the first being 6 inches, the second 12, and the third 6 inches in length, corresponding to residence times of 11.1 seconds for zones 1 and 3, and 22.2 seconds for zone 2. Temperatures of the zones ranged from about 200 to about 225° C., with zone 3 having a higher temperature setting. It was then subjected to additional processing involving a roll-to-roll setup containing a silver organometallic solution coating stage and a tube furnace thermal decomposition. The silver solution comprised from about 15 to about 20 wt % Ag derived from a silver carboxylate salt containing between 8 to 12 carbon atoms dissolved in toluene. Running at a line speed of 2.5 ft/min, residence time in the metallic solution was approximately 5 seconds followed by 57.6 seconds of conductive heat treatment in the furnace. The furnace comprised of three heating zones, the first being 6 inches, the second 12, and the third 6 inches in length, corresponding to residence times of 14.4 seconds for zones 1 and 3, and 28.8 seconds for zone 2. Temperatures of the zones ranged from about 200 to about 225° C., with zone 3 having a higher temperature setting. The resulting fiber was a bright silver color and evenly coated with uniform surface morphology to a resistance range from about 14 to about 30 Ω/ft.

Example 2

A metallized 50/1 ELS Supima® cotton fiber (300D) was formed by thermal decomposition processing similar to Example 1. The resulting fiber was then processed through a roll-to-roll coating process compromising of a solution coating from about 3 to about 7 wt % ethyl cellulose in toluene. The residence time of the fiber in the polymer solution was approximately 10 seconds and the polymer coating was followed by 57.6 seconds of convective heat treatment in the furnace, allowing for adequate curing. The furnace comprised of three heating zones, the first being 6 inches, the second 12, and the third 6 inches in length, corresponding to residence times of 14.4 seconds for zones 1 and 3, and 28.8 seconds for zone 2. Temperatures of the zones ranged from about 200 to about 225° C., with zone 3 having a higher temperature setting. The resulting composite fiber was evenly coated with silver and ethyl cellulose, maintaining a uniform surface morphology and a resistance range from about 14 to about 30 Ω/ft. The addition of the polymer coating resulted in a slight yellowing in fiber appearance, compared to the appearance of the fiber resulting from Example 1. The polymer coated fiber also exhibited more rigidity, although washability and adhesion of the metal layer to the fiber substrate were improved. The polymer coating may also serve as an anti-tarnish layer for the underlying silver coating.

Example 3

A 50/1 ELS Supima® cotton fiber (300D) was processed in a roll-to-roll setup through an immersion solution containing a silver organometallic salt and graphene nano-platelets as an additive. After immersion in the organometallic solution, the coated fiber was introduced to a conductive, 3 stage thermal decomposition in a tube furnace. The immersion solution was synthesized by addition of a silver carboxylate salt (containing 8-12 carbon atoms) to an organic solvent such as toluene providing a final silver concentration from about 15 to about 21 wt % silver metal. To this solution, an amount of expanded graphite flake (~140 micron, Sigma Aldrich) was added that would create a final concentration of graphene nano-platelets in the range from about 0.001 to about 0.1 wt %. After addition of expanded graphite flake to the silver carboxylate solution, the solution was mechanical exfoliated with a high shear blender at a rate from about 10,000 to about 15,000 RPM for about 1 to about 5 hours. The fiber was immersed in this hybrid organometallic solution for 5 seconds and subjected to the thermal decomposition process. Running at a line speed of 2.7 ft/min, residence time in the tube furnace was 45 seconds of conductive heat treatment. The furnace comprised of three heating zones, the first being 6 inches, the second 12, and the third 6 inches in length, corresponding to residence times of 11.1 seconds for zones 1 and 3, and 22.2 seconds for zone 2. Temperatures of the zones ranged from about 200 to about 225° C., with zone 3 having a higher temperature setting. It was then subjected to additional processing involving a roll-to-roll setup containing the same hybrid immersion solution utilized in the preceding stage. Running at a line speed of 2.5 ft/min, residence time in the metallic solution was approximately 5 seconds followed by 57.6 seconds of conductive heat treatment in the furnace. The furnace comprised of three heating zones, the first being 6 inches, the second 12, and the third 6 inches in length, corresponding to residence times of 14.4 seconds for zones 1 and 3, and 28.8 seconds for zone 2. Temperatures of the zones ranged from about 200 to about 225° C., with zone 3 having a higher temperature setting. The resulting fiber was a bright silver color and evenly coated with uniform surface morphology to a resistance range from about 14 to about 30 Ω/ft. Microscopy images revealed small aggregates of graphene nano-platelets throughout the metallic coating signaling that a composite network had been formed between silver, graphene nano-platelets, and the cotton substrate.

Example 4

A metallized 50/1 ELS Supima® cotton fiber (300D) was formed by thermal decomposition processing similar to Example 1. The resultant fiber was immersed in a graphene-nanoplatelet solution and cured in an attempt to coat the fiber and promote adhesion and durability of the final product. This graphene nano-platelet solution comprised of 80 wt % acetone in water to which 0.5 g of expanded graphite powder (~140 micron, Sigma Aldrich) was added. This solution was mechanically exfoliated with a high shear blender at a rate from about 10,000 to about 15,000 RPM for 2 hours. After mechanical exfoliation, the solution was subjected to sonication for 5 hours in an attempt to further disperse the graphene nano-platelets in the coating solution. The fiber was immersed in this solution for 10 seconds and thermally cured in a convective heat treatment similar to that in Example 2. The resultant fiber maintained a bright silver appearance and smooth, uniform surface morphology. Microscopy revealed aggregates of graphene nano-platelets sporadically dispersed on the surface of the silver coated cotton fiber. The final resistance values of the coated composite cotton fiber were from about 14 to about 30 Ω/ft.

Example 5

A 50 denier Vectran® HT LCP multifilament fiber, containing 10 filaments that were 23 microns in diameter, was processed in a roll-to-roll setup containing a silver organometallic solution coating stage and a tube furnace thermal decomposition. Prior to immersion in the silver organometallic solution, the Vectran® fiber was etched using a potassium hydroxide (KOH) solution. Good results have been obtained by etching Vectran® fibers in an aqueous solution of KOH at a temperature of from about 40° C. to about 100° C. In some embodiments, the KOH solution has a concentration of from about 20 wt % to about 75 wt %, wherein the concentration is selected to avoid extensive fiber damage. The silver solution comprised from about 15 to about 20 wt % Ag derived from a silver carboxylate salt containing between 8 to 12 carbon atoms dissolved in toluene. Running at a line speed of 0.7 ft/min, residence time in the metallic solution was approximately 50 seconds followed by about 170 seconds of conductive heat treatment in the furnace. The furnace comprised of three heating zones, the first being 6 inches, the second 12, and the third 6 inches in length, corresponding to residence times of about 43 seconds for zones 1 and 3, and about 86 seconds for zone 2. Temperatures of the zones ranged from about 280 to about 300° C., with zone 3 having a higher temperature setting. After one pass through metal solution and thermal decomposition setup samples had resistance values ranging from about 50 Ω/ft to about 70 Ω/ft.

Example 6

A metallized 3-ply mercerized ELS cotton fiber was formed by thermal decomposition processing similar to Example 1. The resulting fiber was then processed through a roll-to-roll coating process compromising of a solution coating from about 4 to about 12 wt % polystyrene-block-poly(ethylene-ran-butylene)-block-polystyrene-graft maleic anhydride in toluene. The residence time of the fiber in the polymer solution was approximately 10 seconds and the polymer coating was followed by 57.6 seconds of convective heat treatment in the furnace, allowing for adequate curing. The furnace comprised of three heating zones, the first being 6 inches, the second 12, and the third 6 inches in length, corresponding to residence times of about 14 seconds for zones 1 and 3, and about 29 seconds for zone 2. Temperatures of the zones ranged from about 200 to about 225° C., with zone 3 having a higher temperature setting. The resulting composite fiber was evenly coated with silver and graft maleic anhydride, maintaining a uniform surface morphology and a resistance range from about 2 to about 6 Ω/ft. The addition of the polymer coating resulted in a very slight yellowing in fiber appearance, compared to the appearance of the fiber resulting from Example 1. The polymer coated fiber remained flexible and maintained its resistance following washability testing. The rubbery and conformal thin coating improved overall adhesion of the metal layer to the fiber substrate. The polymer coating also may serve as an anti-tarnish layer for the underlying silver coating.

Example 7

A 50 denier Vectran® HT LCP multifilament fiber, containing 10 filaments that were 23 microns in diameter was processed in a roll-to-roll setup containing a silver organometallic solution coating stage and a tube furnace thermal decomposition. The aqueous silver solution comprised from about 18 to about 25 wt % Ag derived from a diamminesilver(I) solution. Running at a line speed of 2.7 ft/min, residence time in the metallic solution was approximately 5 seconds followed by 45 seconds of convective heat treatment in the furnace. The furnace comprised of three heating zones, the first being 6 inches, the second 12, and the third 6 inches in length, corresponding to residence times of 11.1 seconds for zones 1 and 3, and 22.2 seconds for zone 2. Temperatures of the zones ranged from about 200 to about 210° C., with zone 3 having a higher temperature setting. The resulting fiber was a dull, grayish silver color with non-uniform surface morphology, resulting in a resistance range from about 400 to about 600 Ω/ft and inferior adhesion compared to other aforementioned embodiments.

Example 8

A para-aramid paper of 30-micron nominal thickness (1"×1") and porosity of approximately 60% was processed in a bench-top setup comprising a silver organometallic solution coating, a parallel plate thermal decomposition, and final coating of a solvent based polymer solution. The sample was first immersed into the silver organometallic solution comprised from about 15 to about 20 wt % Ag derived from a silver carboxylate salt containing between 8 to 12 carbon atoms dissolved in toluene. Immersion time was approximately 5 seconds. After immersion in the metallic solution, the coated para-aramid paper was placed in a parallel plate heating setup utilizing a combination of convective and conductive heat transfer for approximately 1 minute. The temperature of the thermal setup was in the range from about 220 to about 280° C. The as processed paper was uniformly coated with silver having a certain degree of porosity in the metallic layer. This porosity could result due to the substrate voids, or due to the nature of decomposition of the metallic solution. The as processed paper was highly conductive with resistance values ranging from about 0.17 to about 0.3Ω/□ (ohms per square) and possessing good adhesion to the para-aramid substrate. Additional processing on the sample comprised of immersing the sample in an about 4 to about 8 wt % polystyrene-block-poly(ethylene-ran-butylene)-block-polystyrene-graft maleic anhydride solution in suitable organic solvent, such as toluene. After immersion in the maleic graft anhydride solution, the sample was placed in a parallel plate heating setup utilizing only convective heat transfer and temperatures ranging from about 220 to about 280° C. for approximately 45 seconds. Upon curing the polymer solution, a silver-polymer composite was formed throughout the para-aramid substrate that had good adhesion and flexibility in addition to maintaining the initial resistance values from about 0.17 to about 0.3 Ω/□.

Example 9

A 50/1 ELS Supima® cotton fiber (300D) was processed in a roll-to-roll setup through an immersion solution containing a silver organometallic salt and ethyl cellulose as a binder. After immersion in the organometallic solution, the coated fiber was introduced to a conductive, 3 stage thermal decomposition in a tube furnace. The immersion solution was synthesized by addition of a silver carboxylate salt (containing 8-12 carbon atoms) to an organic solvent such as toluene providing a final silver concentration from about 15 to about 21 wt % silver metal. To this solution, an amount of ethyl cellulose (viscosity 46 cP, 5% in toluene/ethanol 80:20 (lit), 48% ethoxyl, Sigma Aldrich) was added that created a final concentration of ethyl cellulose from about 0.1 to about 0.4 wt %. The fiber was immersed in this hybrid organometallic solution for 5 seconds and subjected to the thermal decomposition process. Running at a line speed of 2.5 ft/min, residence time in the metallic solution was approximately 5 seconds followed by about 58 seconds of conductive heat treatment in the furnace. The furnace comprised of three heating zones, the first being 6 inches, the second 12, and the third 6 inches in length, corresponding to residence times of about 14 seconds for zones 1 and 3, and about 29 seconds for zone 2. Temperatures of the zones ranged from about 200 to about 225° C., with zone 3 having a higher temperature setting. The resulting fiber was a bright silver color and evenly coated with uniform surface morphology to a resistance range from about 35 to about 55 Ω/ft.

Example 10

A para-aramid paper of 30-micron nominal thickness (1"×1") and porosity of approximately 60% was processed in a bench-top setup comprising a silver organometallic solution coating and a parallel plate thermal decomposition. The sample was first immersed into the silver organometallic solution comprised from about 15 to about 20 wt % Ag derived from a silver carboxylate salt containing between 8-12 carbon atoms dissolved in toluene. Immersion time was approximately 5 seconds. After immersion in the metallic solution, the coated para-aramid paper was placed in a parallel plated heating setup utilizing conductive heat transfer for approximately 2 minutes. The temperature of the thermal setup was in the range from about 220 to about 280° C. The as-processed paper was uniformly coated with silver having a certain degree of porosity in the metallic layer. The paper had a resistance value of 0.2 Ω/□. The silver coated aramid paper was subjected to electrolytic copper plating in a 267 mL Hull cell containing copper sulfate and sulfuric acid. The voltage, amperage, and residence time were 0.5 V, 0.5 A, and 3 minutes, respectively. The porosity of the para-aramid paper was decreased after copper electroplating and the majority of silver surfaces were completely and uniformly coated with metallic copper. The resistance of the as process metallic para-aramid paper was 0.09 Ω/□ after copper plating and metallic layers possessed good adhesion to paper substrate.

Testing Procedures

In some embodiments, to quantify improvements in adhesion, washability, and workability throughout the product development, three basic tests were performed on the fibers discussed in Examples 1-7 and 9. Tape testing per ASTM D3359 was performed on at least 5 different areas over 1 foot lengths of fiber. In order to pass the tape test, little to no coating should be seen on the tape and the resistance of the sample could not increase by more than 10% following the testing. As an elementary test for washability, resistance measurements were taken for 2 to 3 foot samples of fiber, which were then wrapped and secured around a wire frame Wardwell® spool. The spool was then placed in a circulating water bath for five minutes and resistance was measured following the rinse. A smaller deviation between initial and final resistance values between samples signals improvement in coating adhesion. In order to test for workability of the metallized yarns/fibers, one foot samples were aggressively handled and then tightly wrapped around the shaft of a needle. Resistance measurements were taken before the wrapping and after the unwrapping to see if the yarn could maintain conductivity following bending around a small radius. Samples also underwent tape and workability testing following the washability testing to confirm that the washing did not deteriorate adhesion. Optical microscopy was performed after all testing to confirm an increase in resistance corresponded to loss of metallic coating. Adhesion quality of each sample was determined by minimization of deviation from initial resistance readings following the outlined qualitative and quantitative testing procedures. Results of illustrative adhesion testing for subsequent examples are summarized in Table 1 and 2.

TABLE 1

| | Material | Ag Coating | Treatment |
|---|---|---|---|
| Example 1 | 50/1 ELS Supima cotton | 2-pass | — |
| Example 2 | 50/1 ELS Supima cotton | 2-pass | Ethyl cellulose coating |
| Example 3 | 50/1 ELS Supima cotton | 2-pass | Graphene nanoplatelets in the Ag solution |
| Example 4 | 50/1 ELS Supima cotton | 2-pass | Graphene nanoplatelets coating |
| Example 5 | 50 D Vectran | 1-pass | Etched |
| Example 6 | Mercerized cotton (3-ply) | 2-pass | Maleic anhydride coating |
| Example 7 | 50 D Vectran | 1-pass | Diamminesilver(I) |
| Example 9 | 50/1 ELS Supima Cotton | 1-pass | Ethyl cellulose in the Ag solution |

TABLE 2

| Consecutive Testing Resistances[1] | | | | | | | |
|---|---|---|---|---|---|---|---|
| $R_0$ | R after Tape | Change in R (%) | R after Needle | Change in R (%) | R after Rinse | Change in R (%) | Overall Difference in R |
| Example 1 | | | | | | | |
| 20.00 | 30.00 | 50.00% | 76.00 | 280.00% | 120.26 | 501.30% | 100.26 |
| Example 2 | | | | | | | |
| 19.20 | 19.40 | 1.04% | 30.02 | 56.35% | 37.34 | 94.48% | 18.14 |
| Example 3 | | | | | | | |
| 23.66 | 35.40 | 49.62% | 42.40 | 79.21% | 110.72 | 367.96% | 87.06 |
| Example 4 | | | | | | | |
| 26.15 | 40.60 | 55.25% | 43.20 | 65.20% | 120.40 | 360.42% | 94.25 |
| Example 5 | | | | | | | |
| 60.00 | 250.00 | 316.67% | FAIL | N/A | FAIL | N/A | N/A |
| Example 6 | | | | | | | |
| 2.19 | 2.10 | −4.12% | 2.25 | 2.74% | 2.34 | 7.04% | 0.15 |
| Example 7 | | | | | | | |
| 500.00 | FAIL | N/A | FAIL | N/A | FAIL | N/A | N/A |
| Example 9 | | | | | | | |
| 45.82 | 52.86 | 15.36% | 62.00 | 35.31% | 114.00 | 148.80% | 68.18 |

[1]Measured in Ω, except where designated (%).

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A method for forming a conductive metal-polymer composite coated polymer, the method consisting of:

providing a cellulose-based polymer substrate having a permeable, open porous structure, the cellulose-based polymer selected from the group consisting of viscose rayon, extra-long staple cotton, lyocell, mercerized cotton, modal, and combinations thereof;

immersing the cellulose-based polymer substrate in a metal solution, the metal solution comprising an organometallic silver compound in an organic solvent;

decomposing the metal solution in a thermally controlled environment to reduce the organometallic silver such that the metal is deposited on a surface of the cellulose-based polymer substrate; and treating the surface with a functional coating after reducing the metal solution to form the metal-polymer composite coated polymer.

2. The method of claim 1, wherein the metal solution is selected from the group consisting of organic or inorganic salts of copper, silver, aluminum, gold, iron, nickel, and combinations thereof.

3. The method of claim 1, wherein the organometallic silver compound is selected from the group consisting of silver acetate, silver octanoate, silver nonanoate, silver neodecanoate, silver undecanoate, silver dodecanoate, silver nitrate, diamminesilver (I), silver (I) hexafluoropentanedionate-cyclooctadiene, silver 2-ethylhexylcarbamate, silver phenolate, and combinations thereof.

4. The method of claim 1, wherein the metal solution comprises an organic solvent selected from the group consisting of xylene, acetone, toluene, benzene, n-methyl pyrrolidone, ethanol, water, and combinations thereof.

5. The method of claim 1, wherein the metal solution comprises an organometallic silver compound in toluene.

6. The method of claim 1, wherein the metal solution comprises an additive selected from the group consisting of ethyl cellulose, graphene nano-platelets, polystyrene-block-poly (ethylene-ran-butylene)-block-polystyrene-graft malefic anhydride, poly (ethylene-co-ethyl acrylate), ethylene-acrylic acid, hexadecyltrimethoxysilane, triethoxy (vinyl) silane, metallic nanoparticles, and combinations thereof.

7. The method of claim 1, wherein the functional coating is selected from a group consisting of ethyl cellulose, graphene nano-platelets, polystyrene-block-poly (ethylene-ran-butylene)-block-poly styrene-graft malefic anhydride, poly (ethylene-co-ethyl acrylate), ethylene-acrylic acid, hexadecyltrimethoxysilane, triethoxy (vinyl) silane, low density polyethylene, polyethylene terephthalate, poly (vinyl butryal-co-vinyl alcohol-co-vinyl acetate), poly vinyl butyral, polystyrene-block-polybutadiene-block-polystyrene, polyurethane, and combinations thereof.

8. The method of claim 1, further comprising, prior to immersing the cellulose-based polymer substrate in a metal solution, modifying the surface of the cellulose-based polymer substrate with a pretreatment surface modification solution.

9. The method of claim 8, wherein the pretreatment surface modification solution is selected from a group consisting of sulfuric acid, hydrochloric acid, hydrofluoric acid, nitric acid, phosphoric acid, perchloric acid, lithium hydroxide, sodium hydroxide, potassium hydroxide, rubidium hydroxide, cesium hydroxide, calcium hydroxide, and combinations thereof.

10. The method of claim 1, wherein decomposing the metal solution comprises a continuous process.

11. The method of claim 10, wherein the cellulose-based polymer substrate is in contact with the metal solution for about 3 to about 12 seconds and is in the thermally controlled environment for about 40 to about 60 seconds.

12. The method of claim 10, wherein the cellulose-based polymer substrate is in contact with the metal solution for about 45 to about 55 seconds and is in the thermally controlled environment for about 160 to about 180 seconds.

13. The method of claim 1, further comprising immersing the cellulose-based polymer substrate in the metal solution, decomposing the metal solution in the thermally controlled environment, and reducing the metal solution to metal such that the metal is deposited on the surface of the cellulose-based polymer substrate more than once before treating the surface with the polymer coating.

14. The method of claim 13, wherein an average temperature in the thermally controlled environment is lower during a first decomposing step than in a subsequent decomposing step.

15. The method of claim 1, wherein an average temperature in the thermally controlled environment is in a range of about 90 to about 300° C.

16. The method of claim 1, wherein decomposing the metal solution in the thermally controlled environment includes maintaining conductive contact between a heating element and the cellulose-based polymer substrate.

* * * * *